(12) United States Patent
Nara et al.

(10) Patent No.: US 6,442,314 B2
(45) Date of Patent: Aug. 27, 2002

(54) ARRAYED WAVEGUIDE GRATING

(75) Inventors: Kazutaka Nara; Kazuhisa Kashihara, both of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/828,827

(22) Filed: Apr. 10, 2001

Related U.S. Application Data

(63) Continuation of application No. PCT/JP00/05309, filed on Aug. 8, 2000.

(30) Foreign Application Priority Data

Aug. 10, 1999 (JP) ............................................. 11-226616

(51) Int. Cl.[7] ................................................. G02B 6/34
(52) U.S. Cl. ............................. 385/37; 385/31; 385/15; 385/14; 385/24
(58) Field of Search ............................. 385/37, 31, 15, 385/14, 24

(56) References Cited

U.S. PATENT DOCUMENTS 5,940,548 A * 8/1999 Yamada et al. ................ 385/14
6,229,938 B1 * 5/2001 Hibino et al. .................. 385/24

OTHER PUBLICATIONS

Takashi Gho et al., "Estimation of Waveguide Phase Error in Silica–Based Waveguide," Journal of Lightwave Technology, vol. 15, No. 11, Nov. 1997, pp. 2107–2113.

* cited by examiner

*Primary Examiner*—Hemang Sanghavi
*Assistant Examiner*—Sung Pak
(74) *Attorney, Agent, or Firm*—Oblon, Spivak, McClelland, Maier & Neustadt, P.C.

(57) ABSTRACT

An arrayed waveguide grating with a first slab waveguide connected to optical input waveguides and to arrayed waveguides for propagating light transmitted from the first slab waveguide. A second slab waveguide is connected to an output end of the arrayed waveguides and to optical output waveguides. The fluctuation in the refractive index of a core in its propagation direction over entire lengths of the arrayed waveguides is restrained. The standard deviation of a phase error distribution generated over the entire lengths of the arrayed waveguides in the propagation direction is restrained to 0.6 rad or less.

4 Claims, 8 Drawing Sheets

US 6,442,314 B2

ARRAYED WAVEGUIDE GRATING

This application is a continuation of international application Ser. No. PCT/JP00/05309 filed on Aug. 8, 2000.

TECHNICAL FIELD

The present invention relates to an arrayed waveguide grating to be used in the field of optical transmissions.

BACKGROUND ART

Recently, in the field of optical transmissions, as a method of significantly increasing transmission capacity, optical wavelength division multiplexing transmission has been successfully researched, developed, and made practicable. As an example of an optical transmission element for optical wavelength division multiplexing transmissions, there is an arrayed waveguide grating (AWG) as shown in FIG. 9. The arrayed waveguide grating is formed so that waveguide forming part 10 having a waveguide composition as shown in the same figure is provided on substrate 11. The composition of the waveguide is as follows.

That is, first slab waveguide 13 is connected to the exit side of one or more optical input waveguides 12 which are disposed in parallel. A plurality of arrayed waveguides 14 disposed in parallel are connected to the exit side of the first slab waveguide 13, and second slab waveguide 15 is connected to the exit sides of the plurality of arrayed waveguides 14. A plurality of optical output waveguides 16 disposed in parallel are connected to the exit side of the second slab waveguide 15. The arrayed waveguides 14 propagate light led out from the first slab waveguide 13, and are formed so as to have lengths which are different from each other.

The optical input waveguides 12 and optical output waveguides 14 are provided so as to accord to the number of, for example, signal light beams which have varying wavelengths to be demultiplexed by the arrayed waveguide grating. Normally, the arrayed waveguides 16 are provided by a large number, for example, 100. However, in this figure, for simplification of the figure, the number of the waveguides 12, 14, and 16 are simplified.

An optical fiber at the transmission side, for example, is connected to the optical input waveguides 12, whereby wavelength multiplexed light is led therein. Light which has passed through the optical input waveguides 12 and has been led into the first slab waveguide 13 is spread by the diffraction effect, made incident onto the plurality of arrayed waveguides 14, and propagated in the arrayed waveguides 14.

Light propagated in the arrayed waveguides 14 reaches the second slab waveguide 15, and furthermore, is condensed by the optical output waveguides 16 and outputted. Since the lengths of the arrayed waveguides 14 are different from each other, phase differences occur in the light beams after being propagated in the arrayed waveguides 14. In accordance with the phase differences, the wavefront of the converged light inclines, and in accordance with the angle of this inclination, the light condensation position is determined. Therefore, the condensation positions of the light beams with varying wavelengths are different from each other, and output waveguides 16 are formed at these positions, whereby light beams with varying wavelengths can be outputted from the different optical output waveguides 16 for each wavelength.

For example, as shown in this figure, if wavelength multiplexed light beams with wavelengths of $\lambda 1$, $\lambda 2$, $\lambda 3$, ... $\lambda n$ (n is an integer of 2 or above) are inputted from one optical input waveguide 12, these light beams are expanded in the first slab waveguide 13. Then, the light beams reach the arrayed waveguides 14, pass through the second slab waveguide 15, and as mentioned above, are condensed on different positions at the exit end of the second slab waveguide 15 for each wavelength. Thereafter, the light beams which are different in wavelength from each other are made incident onto different optical output waveguides 16, pass through the respective optical output waveguides 16, and are outputted from the exit ends of the optical output waveguides 16. When an optical fiber for outputting light is connected to the exit ends of the optical output waveguides 16, the light beams with varying wavelengths are taken out via this optical fiber.

In the arrayed waveguide grating, the wavelength resolution of the grating is in proportion to the differences ($\Delta L$) in length between the arrayed waveguides 14 which comprise the grating. Therefore, by properly setting the $\Delta L$, wavelength multiplexed light can be demultiplexed at narrow wavelength intervals. As an example of such an arrayed waveguide grating, an arrayed waveguide grating is proposed which is arranged so that the difference in optical path lengths between the arrayed waveguides 14 is set to 65.2 $\mu$m, the order of diffraction is set to 61, the total number of arrayed waveguides 14 is set to 100, and wavelength multiplexed light is demultiplexed into 32 waves at intervals of 100 GHz.

When manufacturing an arrayed waveguide grating, first, flame hydrolysis deposition is used to deposit and form a lower cladding layer on silicon substrate 11, and then the layer is consolidate. Next, flame hydrolysis deposition is used to deposit and form a core layer on the consolidate lower cladding layer, and then the core layer is consolidate. Thereafter, an arrayed waveguide grating pattern is transferred onto the core layer by means of photolithography and the reactive ion etching method via a photomask on which the arrayed waveguide grating is drawn.

Thereafter, the core is etched, and the waveguide composition (waveguide pattern) of the arrayed waveguide grating is formed. Thereafter, at the upper side of this waveguide composition, an upper cladding layer is formed by means of flame hydrolysis deposition and consolidate, whereby the arrayed waveguide grating is formed.

The number of deposited layers of the core is generally 6. In FIG. 10, an example of the transmission spectrum of the arrayed waveguide grating is shown. The arrayed waveguide grating having this transmission spectrum is manufactured so that the number of deposited layers of the core is 6, and the optical path length difference between the arrayed waveguides 14, the total number of the waveguides, and the order of diffraction are set to the abovementioned numerical values. In addition, regarding this transmission spectrum, the transmission bandwidth is standardized by the FSR (Free Spectral Range: 25 nm herein), and the transmittance is standardized by means of minimum loss. As can be clearly understood from this figure, in this prior-art arrayed waveguide grating manufactured as mentioned above, the isolation (hereinafter, referred to as cross talk) which is the gap between the transmission loss of the transmission wavelength (A of the figure) and the background transmission loss (B of the figure) is 30 dB.

In the abovementioned dense wavelength division multiplexing transmission system (hereinafter, referred to as the D-WDM transmission system), a crosstalk of approximately 40 dB is required for the arrayed waveguide grating to be applied to this system. However, in the abovementioned prior-art arrayed waveguide grating, since the cross talk is only 30 dB, the characteristics required from the D-WDM transmission system side cannot be satisfied.

Furthermore, the present inventor considers that the deterioration in the cross talk to a degree of 30 dB in the prior-art arrayed waveguide grating is caused by fluctuations in the propagation constant of the core comprising the arrayed waveguide 14. When the amount of deviation of propagated light within each arrayed waveguide from the equiphase wave surface is defined as a phase error, fluctuations in the propagation constant are the phase errors of the propagated light, which causes deterioration of the cross talk of the arrayed waveguide 14. That is, originally, light is condensed to a predetermined one point at the output end of the second slab waveguide 15 for each wavelength. However, if the light deviates due to the phase errors, the light is not condensed to the predetermined one point for each wavelength, but leaks to an adjacent channel, and the cross talk deteriorates.

Therefore, the present inventor calculated the numerical degree of influence of the phase error on the cross talk. The transmission spectrum $T(\lambda)$ is expressed by the sum of the complex electric field distributions of light exited from each arrayed waveguide 14, and this can be expressed as (Formula 1).

$$T(\lambda) = \left| \sum_{m=0}^{M-1} A_m(\lambda) e^{j\phi_m(\lambda)} e^{j\left\{\frac{2\pi}{\lambda} n_{\mathit{eff}}(\lambda) m \Delta L\right\}} \right|^2 \quad \text{(Formula 1)}$$

In (Formula 1), $\lambda$ is the wavelength, M is the number of arrayed waveguides, $A_m$ is the light amplitude of the light electric field distribution emitted from the m-th arrayed waveguide, and $n_{\mathit{eff}}$ is the effective refractive index of the arrayed waveguide. $\Delta L$ is the optical path length difference between the arrayed waveguides, j is an imaginary number $(j=\sqrt{(-1)})$, $\phi_m$ is the phase error between the arrayed waveguides, and this phase error is in accordance with the standard regular distribution of the standard deviation $\sigma(\phi)$. Furthermore, in the arrayed waveguide grating manufactured by means of the prior-art, the number M of arrayed waveguides is 100, and the optical path length difference $\Delta L$ of the arrayed waveguides is 65.2 $\mu$m.

FIG. 3 shows an example of the transmission spectra calculated based on the abovementioned (Formula 1). One (solid line) of the two transmission spectra shown in the figure is the result of calculation of the transmission spectrum in a case where no phase error occurs. Meanwhile, the other transmission spectrum (dashed line) in the same figure is the result of calculation of the transmission spectrum in a case where a standard deviation of $\sigma(\phi)=0.6$ rad exists in the phase error distribution. The relationship between the cross talk and the standard deviation $\sigma(\phi)$ of the phase error distribution in the arrayed waveguide grating can be obtained from the results of calculation of the transmission spectra as mentioned above, and the results thereof are shown in FIG. 4. As can be clearly understood from FIG. 4, the cross talk deteriorates as the standard deviation of the phase error distribution increases. In addition, in the arrayed waveguide grating manufactured by means of the prior-art, since the standard deviation of the phase error distribution is approximately 0.85 rad, it is expected that the cross talk will be approximately 30 dB.

The present invention is made in order to solve problems in the prior-art based on the results of the examination mentioned above. The object of the invention is to provide an arrayed waveguide grating in which the cross talk can be prevented from deteriorating by reducing the phase error of light propagated in the arrayed waveguides.

DISCLOSURE OF THE INVENTION

In order to achieve the above object, the invention employs the following aspects as means for solving the problems. That is, according to the first aspect of the invention, an arrayed waveguide grating in which a plurality of optical signals with varying wavelengths which are inputted from optical input waveguides are propagated while the signals are provided with phase differences for each wavelength by arrayed waveguides, and made incident onto different optical output waveguides for each wavelength, and light beams with varying wavelengths are outputted from the different optical output waveguides, comprising:

one or more of the optical input waveguides disposed in parallel;

a first slab waveguide connected to the exit side of said optical input waveguides;

the plurality of arrayed waveguides, which are disposed in parallel, and have lengths different from each other to propagate light led out from said first slab waveguide, and are connected to the exit side of said first slab waveguide;

a second slab waveguide connected to the exit side of said plurality of arrayed waveguides; and the plurality of optical output waveguides disposed in parallel and connected to the exit side of said second slab waveguide, wherein the standard deviation of the phase error distribution occurring within the plurality of arrayed waveguides is suppressed to 0.6 rad or less.

Also, according to the second aspect of the invention, in addition to the abovementioned first aspect, the standard deviation of the degree of fluctuation in the refractive index of the core comprising the plurality of arrayed waveguides is made to be $4.84 \times 10^{-6}$ or less.

Also, according to the third aspect of the invention, in addition to the first or second aspect, the core comprising the arrayed waveguides is formed by means of flame hydrolysis deposition, and the number of deposited layers of said core is set to 13 or more.

BRIEF DESCRIPTION OF THE DRAWINGS

Also.

Figure 4:
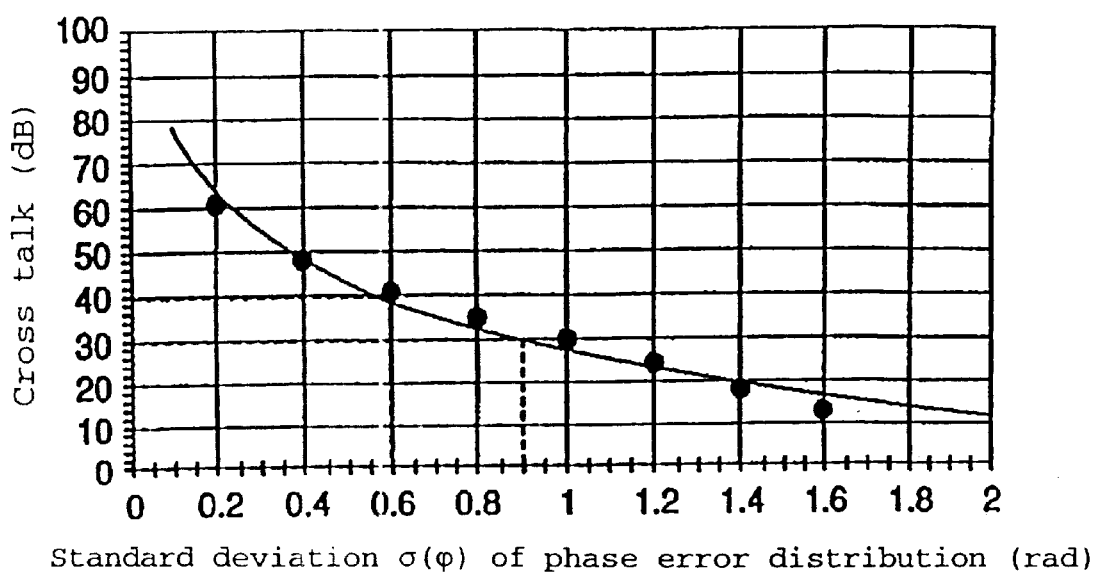
FIG. 4 is a graph showing the relationship between the standard deviation $\sigma(\phi)$ of the phase error distribution and the cross talk.

Based on the abovementioned examination, the present inventor determined the relationship between the cross talk and the standard deviation of the phase error distribution in the arrayed waveguide grating and shown the result thereof in FIG. 4. Then, the inventor found that the standard deviation $\sigma(\phi)$ of the phase error distribution must be suppressed to approximately 0.6 rad or less in the arrayed waveguide grating from the same figure in order to suppress the cross talk to 40 dB or less which is the required value from the D-WDM transmission system.

According to the invention, in the arrayed waveguide grating, since the standard deviation of the phase error distribution occurring in the plurality of arrayed waveguides is suppressed to 0.6 rad or less, the cross talk can be suppressed to 40 dB or less.

On the other hand, in the arrayed waveguide grating, the phase error $\phi_i$ is expressed as (Formula 2).

$$\phi_i = \int_0^L \left\{ \left(\frac{\partial \beta}{\partial t}\right) \delta t_i(z) + \left(\frac{\partial \beta}{\partial w}\right) \delta w_i(z) + \left(\frac{\partial \beta}{\partial n}\right) \delta n_i(z) \right\} dz \quad \text{(Formula 2)}$$

In (Formula 2), $\phi_i$ is the phase error, i is the arrayed waveguide number, L is the length of the arrayed waveguide, and $\beta$ is the propagation constant. Also, $\delta t_i(z)$ is the fluctuation in the layer thickness in the propagation direction z of the i-th arrayed waveguide, $\delta w_i(z)$ is the fluctuation in the waveguide width in the propagation direction z of the i-th arrayed waveguide, and $\delta n_i(z)$ is the fluctuation in the refractive index in the propagation direction z of the i-th arrayed waveguide.

Furthermore, the differential coefficients $(\partial \beta/\partial t)$, $(\partial \beta/\partial w)$, and $(\partial \beta/\partial n)$ of the parameters (layer thickness, line width, and refractive index) of the propagation constant $\beta$ are calculated near the designed values of the core comprising the arrayed waveguide grating by means of the effective refractive index method, which are nearly constants. In addition, generally, as the designed values for the core, the relative index difference $\Delta = 0.80\%$, the layer thickness $T = 6.5$ $\mu$m, and the line width $w = 6.5$ $\mu$m. The values of the differential coefficients calculated by means of the effective refractive index method are $(\partial \beta/\partial t) = 0.002$, $(\partial \beta/\partial w) = 0.002$, and $(\partial \beta/\partial n) = 3.542$.

Thus, when the differential coefficients $(\partial \beta/\partial t)$, $(\partial \beta/\partial w)$, and $(\partial \beta/\partial n)$ of the parameters (layer thickness, line width, and refractive index) of the propagation constant $\beta$ are compared with each other, it can be understood that the value of contribution of the refractive index to the propagation constant is larger than that of the other parameters by 3 digits or more. Therefore, in the abovementioned formula of the phase error, the influences of the layer thickness and line width can be ignored, and the formula can be approximated by (Formula 3).

$$\phi_i = \int_0^L \left\{ \left(\frac{\partial \beta}{\partial n}\right) \delta n_i(z) \right\} dz \quad \text{(Formula 3)}$$

Next, when the standard deviation $\sigma(\phi)$ of the phase error distribution between the arrayed waveguides is calculated as shown by the following (Formula 4).

$$\sigma(\phi) = \int_0^L \left\{ \left(\frac{\partial \beta}{\partial n}\right) \sigma(\delta n_i(z)) \right\} dz \quad \text{(Formula 4)}$$

The refractive index fluctuates in the direction of propagation in each arrayed waveguide, and due to the fluctuation, a portion with a large refractive index and a portion with a small refractive index exist. The center value between the maximum value and minimum value of the refractive index, that is, the center value in the range of fluctuation in the refractive index is called the refractive index center value, which is expressed as $\delta n_i[\text{avg}]$. If so, the refractive index must fluctuate around the $\delta n_i[\text{avg}]$ in the propagation direction of the arrayed waveguide, so that the fluctuation can be approximately expressed as the following (Formula 5).

$$\sigma(\phi) = \int_0^L \left\{ \left(\frac{\partial \beta}{\partial n}\right) \sigma(\delta n_i[\text{avg}]) \right\} dz \quad \text{(Formula 5)}$$

$$= \left(\frac{\partial \beta}{\partial n}\right) \sigma(\delta n_i[\text{avg}]) L_a$$

$L_a$ in (Formula 5) is the average of the lengths of all arrayed waveguides.

As mentioned above, the standard deviation of the phase error distribution can be expressed as the standard deviation of the fluctuation in the refractive index of light propagated in the arrayed waveguides. Therefore, based on (Formula 5), in a general arrayed waveguide grating which has been priorly proposed, the standard deviation of the amount of fluctuation in the refractive index of light in order to achieve the standard deviation of the phase error distribution (approximately 0.6 rad or less calculated based on FIG. 4) to suppress the cross talk to 40 dB or less is calculated. As a result, it is found that the standard deviation of the amount of fluctuation in the refractive index of light propagated in the arrayed waveguides (that is, the standard deviation of the amount of fluctuation in the refractive index of the core of the plurality of arrayed waveguides) may be suppressed to $4.84 \times 10^{-6}$ or less.

In addition, in the general arrayed waveguide grating which has been priorly proposed, as mentioned above, the optical path length difference is 65.2 $\mu$m, the number of arrayed waveguides is 100, and the order of diffraction is 61. Furthermore, the general arrayed waveguide grating which has been priorly proposed multiplexes or demultiplexes light of 32 waves at intervals of 100 GHz. In such an arrayed waveguide grating, the average of the lengths of all arrayed waveguides is approximately 35000 $\mu$m. Therefore, by using this value, based on the above (Formula 5), the standard deviation of the amount of fluctuation in the refractive index is calculated so that the required characteristics (cross talk: 40 dB or less) of the arrayed waveguide grating are satisfied. As a result, it is found that the value of the standard deviation of the fluctuation in the refractive index may be suppressed to $4.84 \times 10^{-6}$ or less.

According to the second aspect of the invention, based on the abovementioned results of examination, the standard deviation of the fluctuation in the refractive index of the plurality of arrayed waveguide in the arrayed waveguide grating is suppressed to 4.84×10⁻⁶ or less. Therefore, according to the second aspect of the invention, the standard deviation of the phase error distribution can be suppressed to 0.6 rad or less, and the cross talk can be suppressed to 40 dB or less.

Therefore, by applying the arrayed waveguide grating according to the first aspect or second aspect of the invention to the D-WDM transmission system, the required characteristics of the D-WDM transmission system can be satisfied.

Figure 5:
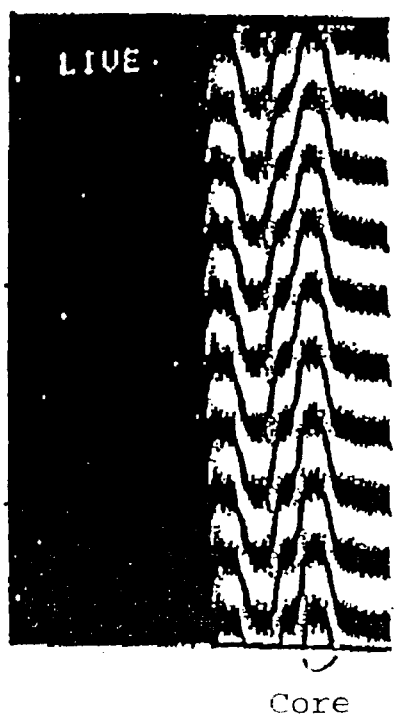
FIG. 5 is an explanatory view showing the results of observation of fluctuations in the refractive index which occur like convex striate depending on the number of flame deposited layers.

In addition, the present inventor investigated how to form an arrayed waveguide grating in order to suppress the fluctuation and the standard deviation of the phase error distribution. When examining this, the inventor measured the refractive index of the core by using a transmission type interference microscope. Then, as shown in FIG. 5, fluctuation in the refractive index occurring like convex striate which depend on the number of deposited layers was observed.

Therefore, in order to suppress the fluctuations in the refractive index which occur like convex striate, the following method was employed. It is generally known that the lower the layer of soot deposited due to flame hydrolysis reaction, the greater the fluctuation in the density occurs due to the flame from the above, and accordingly, fluctuation in the refractive index occurs. Therefore, a formulation is made so that the lower the layer, the greater is the occurrence of fluctuation in the refractive index, whereby the refractive index distribution of the core having fluctuations in the refractive index which occur like convex striate can be expressed as the following (Formula 6).

$$n_{core}(t) = \sqrt{n_0^2(1+2\Delta f(t))}$$ (Formula 6)

In (Formula 6), $n_0$ is the designed value of the refractive index of the core, and $f(t)$ shows the fluctuation in the refractive index which is expressed by (Formula 7).

$$f(t) = \varepsilon\left(1 - \frac{t}{a}\right)\cos\left(2\pi N \frac{t^2}{a^2}\right)$$ (Formula 7)

Herein, $\varepsilon$ is the degree of the amount of fluctuations in the refractive index which occur like convex striate, a is the layer thickness (constant) of the core, N is the number of fluctuations in refractive index (the number of deposited layers) in the direction of the layer thickness of the core, and t is the layer thickness (variable) in the direction of the layer thickness of the core. The layer thickness a of the core is generally 6.5 μm.

Figure 6:
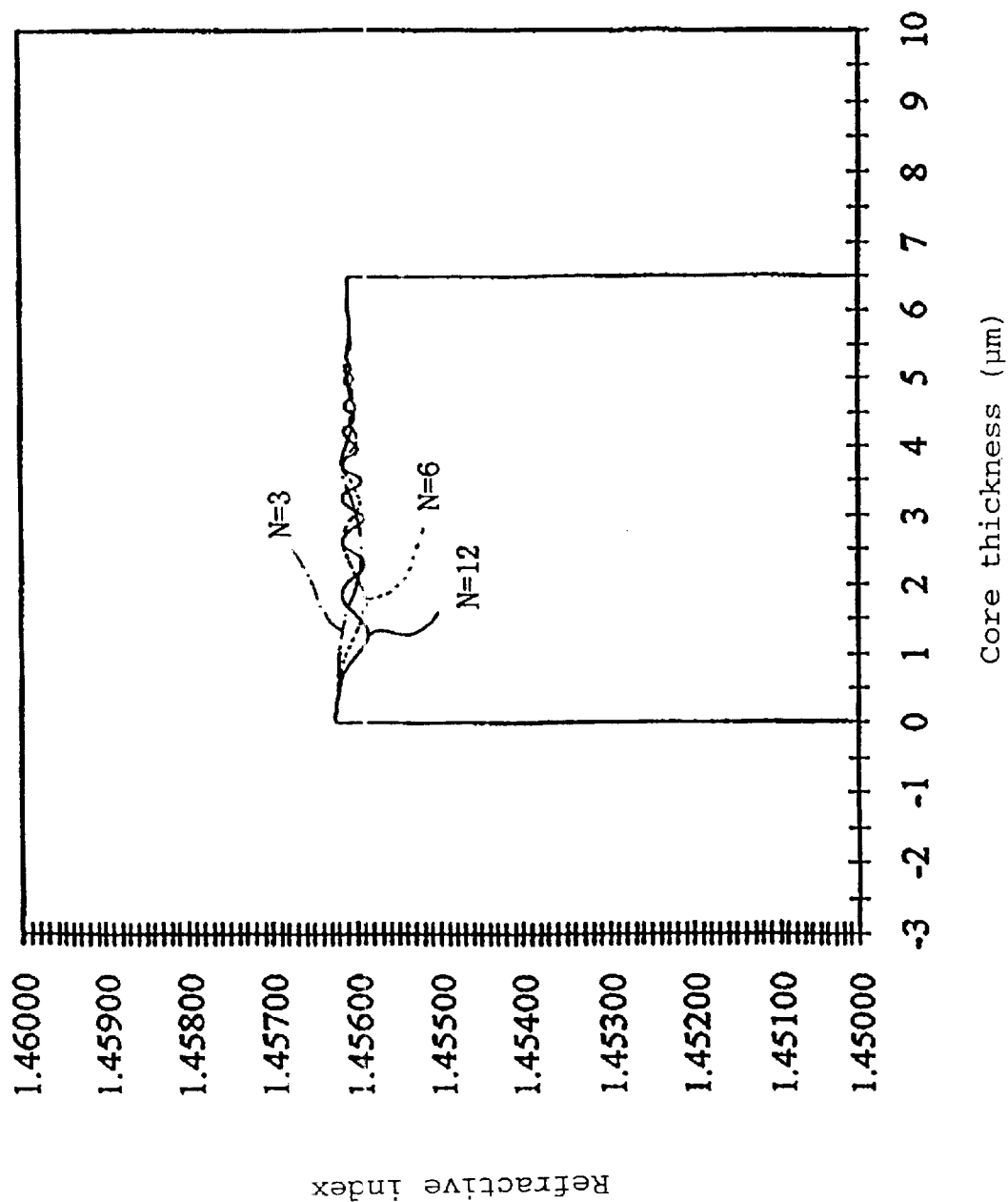
FIG. 6 is a graph showing the difference in refractive index distribution depending on the difference in the number of deposited layers of the core.

FIG. 6 shows the refractive index distribution in which calculations with regard to N=3, 6, and 12 are made by using (Formula 6). The refractive index distribution shown in the same figure is the distribution at a wavelength of 1.55 μm.

Figure 7:
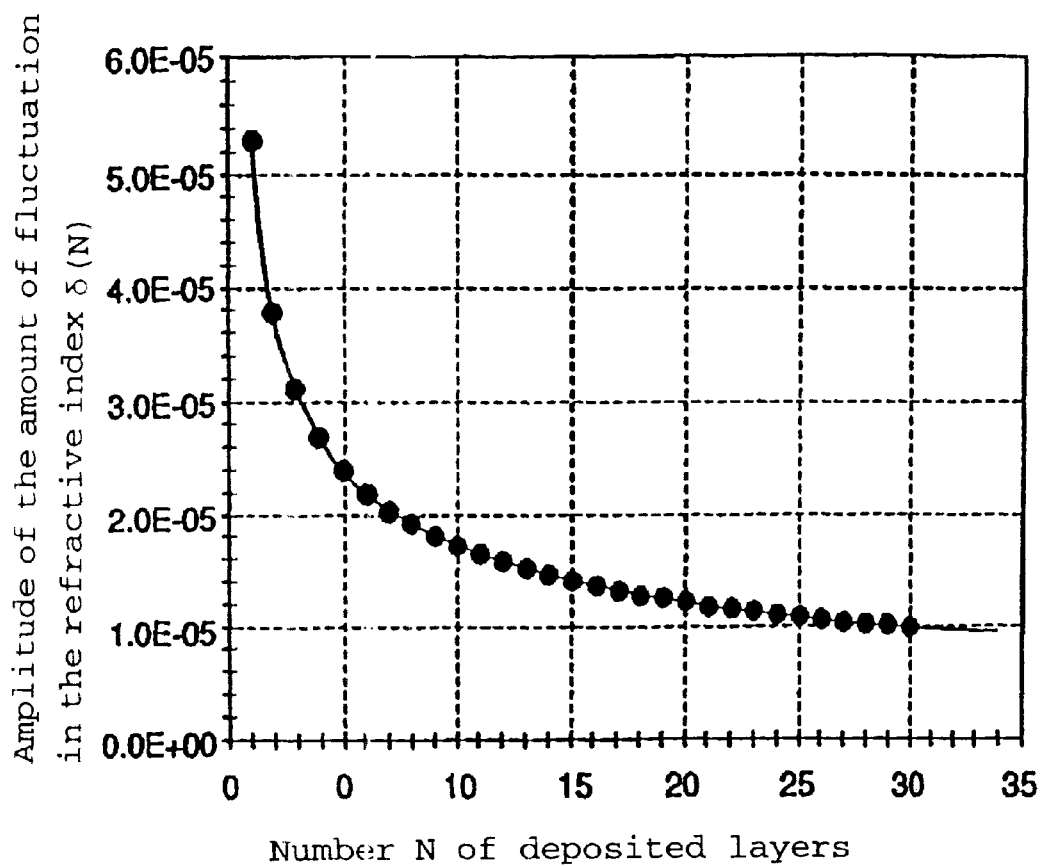
FIG. 7 is a graph showing the relationship between the number N of deposited layers of the core and the amount of fluctuation in the refractive index δn of the core.

FIG. 7 shows the plotted results of the amounts of fluctuation in the refractive index δn from the original designed value (in the case without fluctuation, that is, $\varepsilon=0$) with respect to N. The results shown in FIG. 7 are the results of calculations of the core refractive index from the average distribution in the case where the N is varied in the core having the refractive index distribution of (Formula 6). In addition, when calculating the core refractive index, the designed value of the core refractive index $n_0$=1.456054 (λ=1.55 μm), the core layer thickness a=6.5 μm, and $\varepsilon$=0.0185. E-0.5 of the vertical axis of FIG. 7 means ×10⁻⁵, and for example, 1.0E-0.5 means 1.0×10⁻⁵.

It was found from FIG. 7 that the relationship between the amount of fluctuation in the refractive index δn and the number N of deposited layers of the core is expressed as the following (Formula 8).

$$\delta n \propto \frac{1}{\sqrt{N}}$$ (Formula 8)

Furthermore, if it is considered that fluctuations in the refractive index of the core is distributed within the wafer surface at an amplitude of δn, the standard deviation σ(δn) of the fluctuation in the refractive index also satisfies (Formula 8).

In addition, as mentioned above, the phase error is almost in proportion to the amount of fluctuation in the refractive index. Therefore, in order to suppress the standard deviation of 0.85 rad of the phase error distribution in the prior-art to 0.60 rad or less, the standard deviation of the amount of fluctuation in the refractive index must be suppressed to be 0.60/0.85=0.70 times the standard deviation of the prior-art. When, in order to suppress the amount of fluctuation in the refractive index to be 0.70 times that of the prior-art, the number of deposited layers of the core was converted by using (Formula 8), it was found that 13 or more layers (since 6/0.70²=12.24) was desirable.

According to the third aspect of the invention, based on the abovementioned examination, the number of deposited layers of the core is set to 13 or more. Therefore, according to the third aspect of the invention, the standard deviation of the phase error distribution of the plurality of arrayed waveguides in the arrayed waveguide grating can be suppressed to 0.60 rad or less. Furthermore, according to the third aspect of the invention, the standard deviation of the amount of fluctuation in the refractive index of the core of the arrayed waveguide can be securely suppressed to 4.84×10⁻⁶ or less. Thereby, according to the third aspect of the invention, an arrayed waveguide grating can be provided in which low cross talk of 40 dB or less is achieved.

BEST MODE FOR CARRYING OUT THE INVENTION

Figure 1:
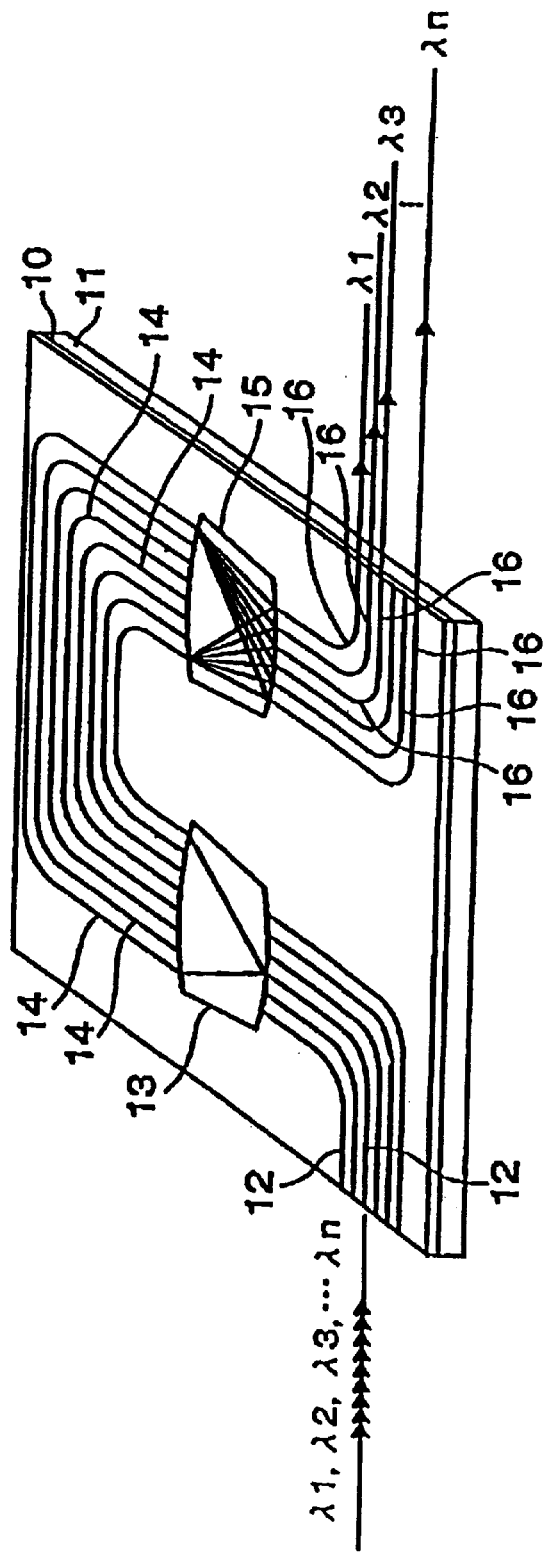
FIG. 1 is a constructional view of the main part which schematically shows the first embodiment of the arrayed waveguide grating relating to the invention.

The invention shall be described in detail based on the embodiments with reference to the attached drawings. In the description of the embodiments, components which are the same as in the prior-art example have the same symbols attached, and overlapped description thereof is omitted. FIG. 1 is a constructional view of the main part of the first embodiment of the arrayed waveguide grating relating to the invention.

Figure 9:
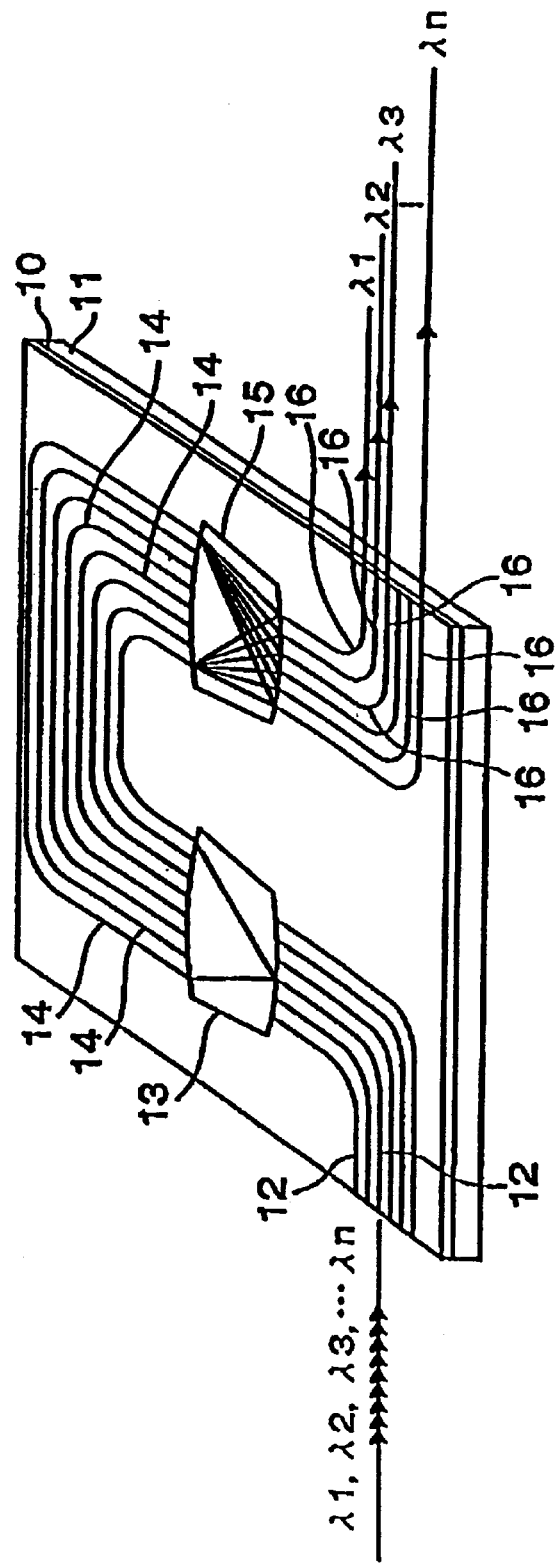
FIG. 9 is an explanatory view schematically showing the prior-art arrayed waveguide grating.
Figure 10:
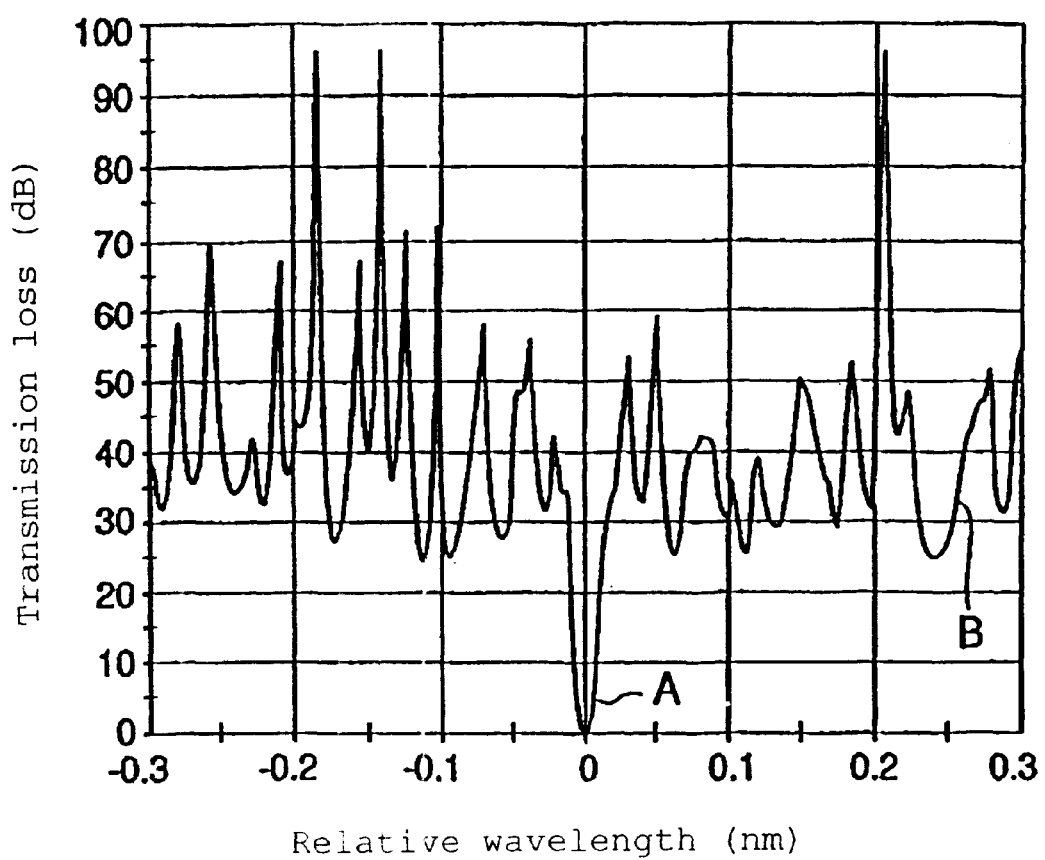
FIG. 10 is a graph showing the specific results of transmission spectrum of the prior-art arrayed waveguide grating.

In the arrayed waveguide grating of the present embodiment, as the prior-art arrayed waveguide grating shown in FIG. 9, optical waveguide part 10 having the waveguide composition shown in FIG. 1 is formed on silicon substrate 11. The feature of the present embodiment which is the point that is different from the prior-art example is that the number of deposited layers of the core forming the waveguide composition is set to 13, and the standard deviation of the amount of fluctuation in the refractive index of the core comprising all arrayed waveguides 14 is suppressed to 4.84×10⁻⁶ or less. According to these arrangements, the standard deviation of the phase error distribution occurring within all arrayed waveguides 14 is suppressed to 0.6 rad or less.

The present embodiment is thus arranged, and next, the manufacturing method of the present embodiment shall be described. First, a lower cladding layer ($SiO_2$—$B_2O_3$—$P_2O_5$-based) is formed on the silicon substrate 11 by means of flame hydrolysis deposition and then consolidated, and a core layer ($SiO_2$—$B_2O_3$—$P_2O_5$—$GeO_2$-based) is formed on the lower cladding layer by means of flame hydrolysis deposition and then consolidated. In the present embodiment, when depositing the core layer, the amount of material to be supplied to the core layer is set to be the same as that of 6-layer deposition in the prior-art, and accordingly, the speed of the burner for synthesizing fine glass particles when depositing the core layer is made to be double that of the prior-art (twice the speed when depositing 6 layers). In the present embodiment, due to such arrangements, the number of deposited layers of the core layer is set to 13.

Next, in the same manner as the prior-art example, by using a photomask on which the waveguide composition of the arrayed waveguide grating is drawn, the photomask pattern is transferred onto the core layer by means of photolithography and reactive ion etching. Thereafter, cladding glass particles to be embedded are deposited on the core pattern by means of flame hydrolysis deposition, then consolidated, whereby an upper cladding layer is formed.

The arrangement of the arrayed waveguide grating of the present embodiment was determined based on the results of examination by the present inventor (results of examination based on FIG. 3 through FIG. 7 and (Formula 1) through (Formula 8)) as mentioned above. That is, in the present embodiment, based on the abovementioned results of examination, the number of deposited layers of the core forming the waveguide composition including the arrayed waveguides 14 was set to 13, whereby the standard deviation of the amount of fluctuation in the refractive index of the core comprising all arrayed waveguides 14 was suppressed to $4.84 \times 10^{-6}$ or less. And, according to this arrangement, in the present embodiment, the standard deviation of the phase error distribution occurring within all arrayed waveguides 14 was suppressed to 0.6 rad or less.

Therefore, in the arrayed waveguide grating of the present embodiment, the phase error of the arrayed waveguides 14 can be suppressed, and the cross talk can be suppressed to 40 dB or less. Therefore, the arrayed waveguide grating of the present embodiment can satisfy the characteristics required for a D-WDM transmission system when it is applied to the D-WDM transmission system.

Figure 2:
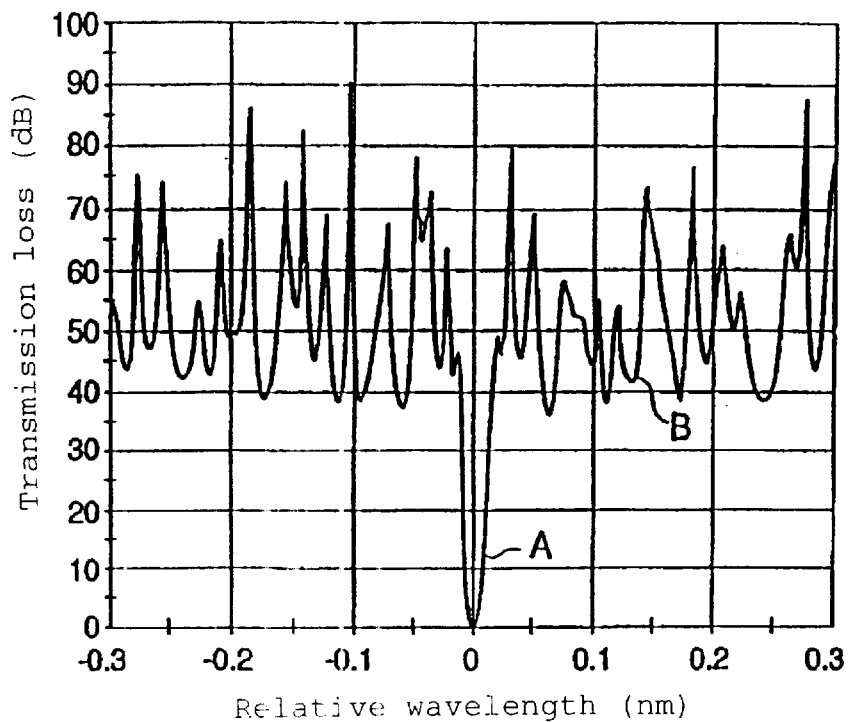
FIG. 2 is a graph showing the results of measurement of transmission spectrum in the first and second embodiments of the arrayed waveguide grating.
Figure 3:
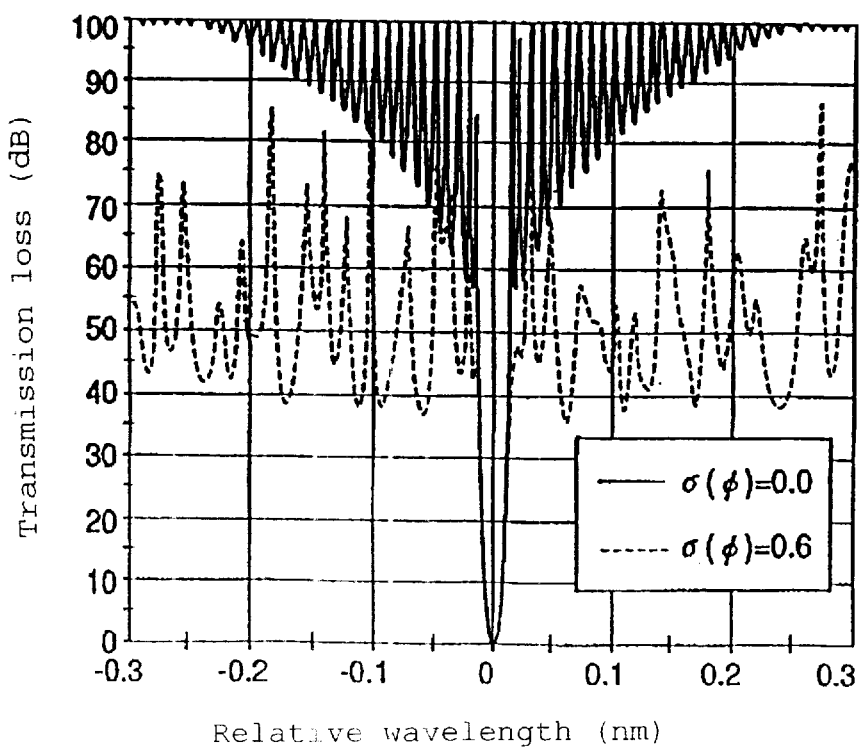
FIG. 3 is a graph showing the results of calculations of transmission spectra in the case where no phase error occurs in the arrayed waveguides and in the case where the standard deviation $\sigma(\phi)=0.6$ rad of the phase error distribution exists.

FIG. 2 shows the transmission spectrum of the arrayed waveguide grating of the present embodiment. Also, as mentioned above, regarding this transmission spectrum, the transmission bandwidth is standardized by the FSR (Free Spectral Range: about 25 nm herein), and the transmittance is standardized by means of the minimum loss. As can be clearly understood from the same figure, in the present embodiment, the cross talk which is the gap between the transmission loss (A of the figure) of the transmission wavelength and the background transmission loss (B of the figure) is significantly improved in comparison with the prior-art example. That is, although the cross talk of the prior-art arrayed waveguide grating is approximately 30 dB, the cross talk of the arrayed waveguide grating of the present embodiment is approximately 40 dB. According to the transmission spectrum of FIG. 2, it was confirmed that the cross talk of the arrayed waveguide grating of the present embodiment could be much improved compared with the case of the prior-art example.

Next, the second embodiment of the arrayed waveguide grating of the invention shall be described. The second embodiment is arranged in almost the same manner as in the abovementioned first embodiment. The feature of the second embodiment which is the point that is different from the first embodiment is that the deposition method of the core when manufacturing the arrayed waveguide grating is different from that of the first embodiment. That is, in the second embodiment, the amount of the material to be supplied to the core layer is set to be half of that of the prior-art 6-layer deposition, and the speed of the burner for synthesizing fine glass particles when depositing the core is made equal to the speed when depositing 6 layers in the prior-art, and the number of the deposited layers of the core is set to 13.

The second embodiment is thus arranged, and when the transmission spectrum of the arrayed waveguide grating of the present embodiment was measured, the same result as that in FIG. 2 was obtained. Therefore, it was confirmed that the second embodiment has the same effect as in the first embodiment.

Next, the third embodiment of the arrayed waveguide grating of the invention shall be described. The third embodiment is arranged in almost the same manner as in the abovementioned first embodiment. The feature of the third embodiment which is the point that is different from the abovementioned first and second embodiments is that the number of deposited layers of the core layer is set to 24. In addition, in the third embodiment, the amount of material to be supplied to the core layer is set to be a quarter of that of the prior-art 6-layer deposition, and the speed of the burner for synthesizing fine glass particles is set to be equal to the speed when depositing 6 layers in the prior-art.

Figure 8:
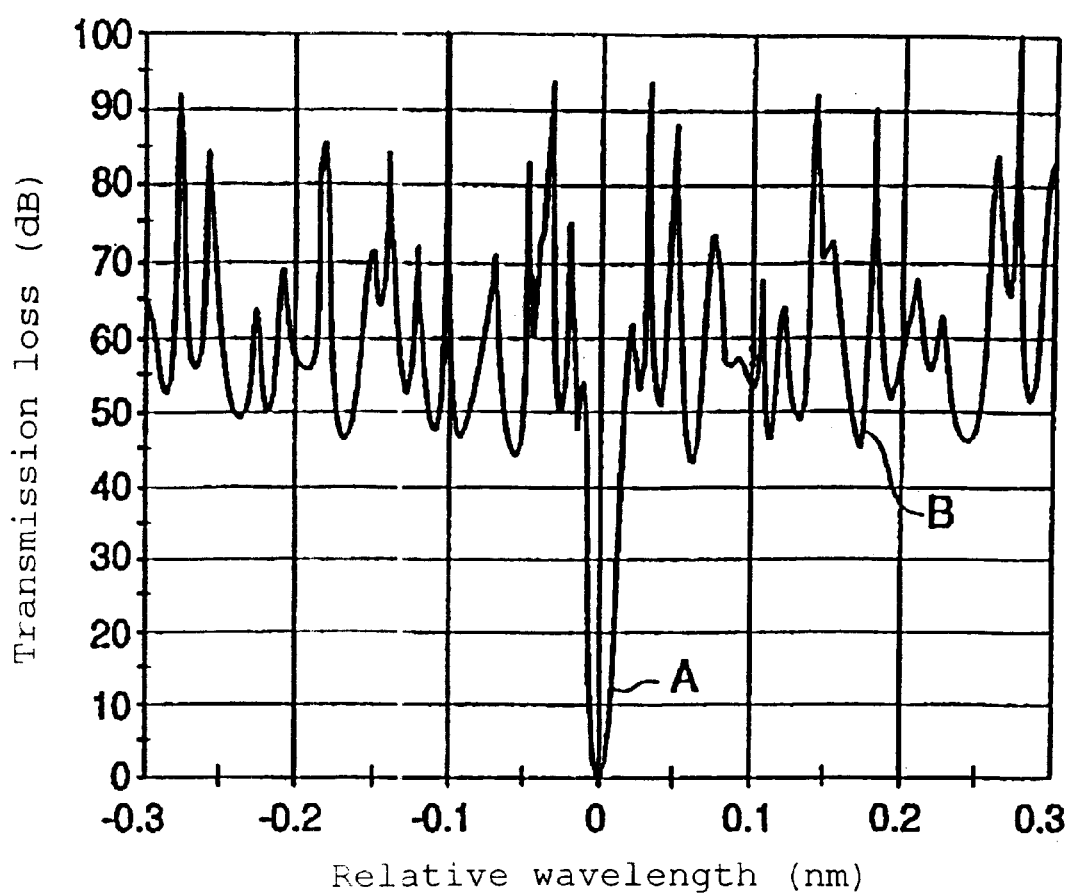
FIG. 8 is a graph showing the results of measurement of the transmission spectrum of the third embodiment of the arrayed waveguide grating.

The present embodiment is thus arranged, and the transmission spectrum of the third embodiment is as shown in FIG. 8. As can be clearly understood from FIG. 8, in the arrayed waveguide grating of the third embodiment, the cross talk which is the gap between the transmission loss (A of the figure) of the transmission wavelength and the background transmission loss (B of the figure) can be improved up to approximately 46 dB. When comparing this result and the prior-art example, it was confirmed that the background cross talk in the arrayed waveguide grating of the present embodiment was significantly improved in comparison with the prior-art example.

The present invention is not limited to the abovementioned embodiments, but various embodiments can be employed. For example, the number of deposited layers of the core forming the waveguide composition including the arrayed waveguides 14 is set to 13 in the abovementioned first and second embodiments, and the number of deposited layers of the core is set to 24 in the third embodiment. However, the number of deposited layers of the core is not especially limited, but is set to a proper number of 13 or more.

Also, the composition of the optical waveguide part 10 of the arrayed waveguide grating is not especially limited. The composition of the optical waveguide part 10 of the arrayed waveguide grating is properly set by using, for example, quartz as a main material.

Industrial Applicability

As described above, in the arrayed waveguide grating of the invention, since the phase error of light propagated in the arrayed waveguides can be suppressed by properly suppressing fluctuations in the refractive index of the plurality of arrayed waveguides, low cross talk of 40 dB or less can be realized. Therefore, the arrayed waveguide grating of the invention is suitable as an optical transmission element for the D-WDM transmission system.

What is claimed is:

1. An arrayed waveguide grating in which a plurality of optical signals with varying wavelengths which are inputted from optical input waveguides are propagated while the signals are provided with phase differences for each wavelength by arrayed waveguides, and made incident onto different optical output waveguides for each wavelength, and light beams with varying wavelengths are outputted from the different optical output waveguides, comprising:

one or more of the optical input waveguides disposed side-by-side;

a first slab waveguide connected to the output end of said optical input waveguides;

the plurality of arrayed waveguides, which are disposed side-by-side, and have lengths different from each other to propagate light led out from said first slab waveguide, and are connected to the output end of said first slab waveguide;

a second slab waveguide connected to the output end of said plurality of arrayed waveguides; and the plurality of optical output waveguides disposed side-by-side and connected to the output end of said second slab waveguide, wherein a fluctuation in the refractive index of a core in its propagation direction over entire lengths of said arrayed waveguides is restrained, causing the standard deviation of the phase error distribution generated on the entire length of the plurality of arrayed waveguides in the propagation direction to be restrained to 0.6 rad or less.

2. An arrayed waveguide grating as set forth in claim 1, wherein the standard deviation of the fluctuation in the refractive index of the core over the entire lengths of the plurality of arrayed waveguides in the propagation direction is restrained to $4.84 \times 10^{-6}$ or less.

3. An arrayed waveguide grating as set forth in claim 1, wherein the core comprising the arrayed waveguides is formed by means of flame hydrolysis deposition, and the number of deposited layers of said core is set to 13 or more.

4. An arrayed waveguide grating as set forth in claim 2, wherein the core comprising the arrayed waveguides is formed by means of flame hydrolysis deposition, and the number of deposited layers of said core is set to 13 or more.

* * * * *